Patented Sept. 17, 1929

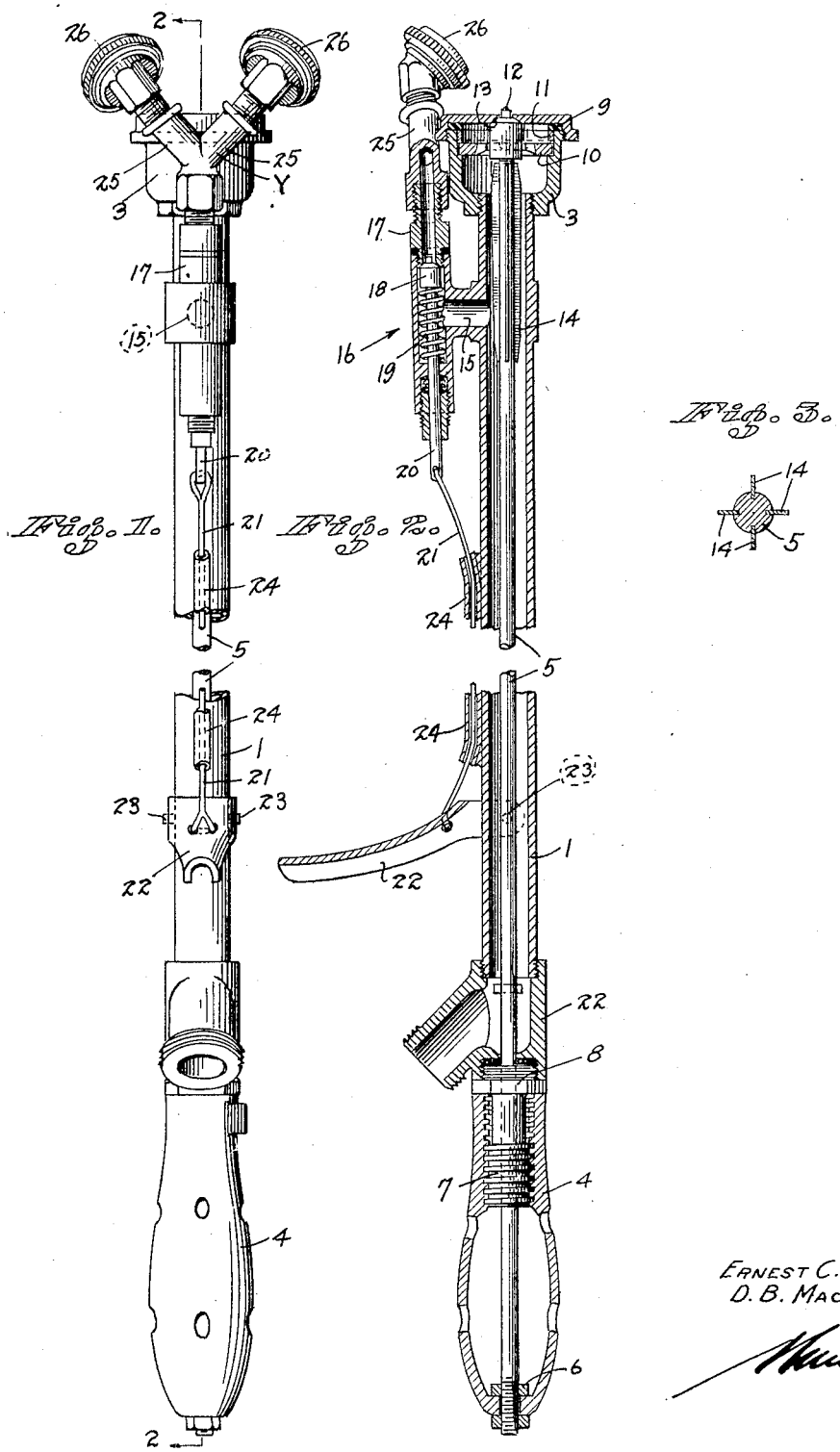

1,728,455

UNITED STATES PATENT OFFICE

ERNEST CLYDE TAYLOR AND DAVID BARCLAY MACKIE, OF SACRAMENTO, CALIFORNIA

COMBINED ROD AND GUN

Application filed February 28, 1928. Serial No. 257,654.

Our invention relates to improvements in rods and guns combined, and it consists of the combinations, constructions, and arrangements hereinafter described and claimed.

Persons who spray trees, hedges, and the like, for killing insects inhabiting the same, usually carry with them a spray rod and a spray gun. These are two distinct implements, and are for two particular kinds of work. The rod permits the sprayer to place the device in a position for spraying the underside of the leaves of low shrubbery, with ease, and this same rod can be used for spraying up to a height of six feet. For any point higher it is necessary to use a gun. A gun cannot be used efficiently under six feet without placing it close to the ground. This causes the operator to bend or kneel upon the ground in order to spray the undersides of low leaves. If this is not done, he is compelled to change to a rod.

The principal object of the present invention is to combine a spray rod and gun for accomplishing both kinds of work with the same device. The rod makes use of two spray nozzles that are inclined with respect to each other for directing a stream upwardly at an angle of 45° when the rod is held in a vertical position. The rod emits a fine stream that is not injurious to foliage. If the gun were used close to the foliage, as would be necessary for work close to the ground, the stream issuing from the gun would injure the blossoms, fruits, or leaves, because this stream is more coarse than the stream thrown out by the rod. We therefore use a device which makes use of the rod principle for work close to the ground and makes use of the gun principle for work extending six feet or more above the ground. The gun can efficiently spray trees up to a height of seventy feet.

We have found that when these two devices are combined, a length of five feet over all is ample and provides a device which best meets the needs for all kinds of work. The combination rod and gun does away with the necessity of the operator first using one instrument and then using the other, and also does away with the necessity of carrying two devices to the place of work. The device furthermore saves time when changing from one to the other, as the rod is designed to automatically shut off when the operator releases the actuating lever and grasps the control handle for the gun.

A further object of our invention is to provide a device of the type described which is simple in construction and which can be used efficiently in spraying anything from the ground up.

Other objects and advantages will appear in the following specification, and the novel features of the device will be particularly pointed out in the appended claim.

Our invention is illustrated in the accompanying drawing forming a part of this application, in which:

Figure 1 is a rear elevation of the device;

Figure 2 is a section along the line 2—2 of Figure 1; and

Figure 3 is a transverse section through the gun-actuating shaft.

In carrying out our invention we provide a tubular casing 1 that forms the main body of the gun. A T 2 is secured to the casing 1, and this may be connected to a hose that delivers the insecticide to the gun. A gun head 3 is mounted at one end of the casing 1, and a control handle 4 is mounted at the other end. A control shaft 5 extends throughout the length of the casing 1 and is secured to the handle 4 by nuts 6. The handle is threaded upon a screw 7, and this screw in turn is integral with a packing nut 8. This nut seals the lower end of the casing 1. A rotation of the handle 4 upon the screw 7 will move the shaft 5 longitudinally within the casing.

The head 3 of the gun carries a cap 9, and this cap encloses a whirling plate 10. The plate 10 is carried by the head 3 and bears against a head ring 11. The upper end of the shaft 5 is fashioned into a valve 12, and this valve is adapted to seat upon a valve seat opening 13 in the cap 9. Fins 14 (see Figure 3) are carried by the shaft 5 and extend longitudinally along the shaft for a short distance. These fins are disposed adjacent to the valve 12 and prevent the whirling of the fluid within the casing 1 just prior to its entrance into the head 3. When once the fluid enters the head 3, it is subjected to a whirling action by the plate 10. The amount of fluid flowing out from the head 3 is controlled by the handle 4 and the valve 12.

The casing 1 has a by-pass 15 that communicates with a spray rod indicated generally at 16. The rod 16 has a casing 17 in which a valve 18 is mounted. This valve is spring-pressed and is normally held in closed position by a spring 19. A plunger shaft 20 extends from the valve 18 and is connected by means of a wire 21 to a spray rod lever 22. The lever is pivoted at 23 to the casing 1, and the wire 21 is enclosed for the greater part of its length in a tube 24.

Figure 1 shows how the spray rod 16 branches into a Y and how each leg 25 of the Y terminates in a spray nozzle 26. The spray nozzles are inclined at 45° with respect to the longitudinal axis of the leg 25 for a purpose hereinafter described.

From the foregoing description of the various parts of the device, the operation thereof may be readily understood.

When using the device as a spray rod, the valve 12 is closed and the lever 22 is manipulated for allowing as much fluid as desired to flow from the nozzles 26. The nozzles are of standard construction and are therefore not shown in detail. They are designed to emit a fine spray stream that will not injure delicate plants even when the nozzle is brought very close to the plants. The operator can hold the casing 1 in a position for causing the nozzles 26 to direct the spray upwardly against the underside of the leaves. This is the place where the insects lay their eggs. The casing is short enough to readily permit this operation, and the nozzles 26 are inclined at the right angle to obviate the necessity of the operator kneeling down upon the ground when using the rod.

After the shrubbery has been sprayed to a height of six feet and it is desired to spray still higher, the lever 22 is released and the valve 18 will instantly close. The handle 4 may now be manipulated for moving the valve 12 into open position. When this valve is backed off from its seat, a slight distance, the material is forced through the whirling plate and a mist is thrown from the gun which spreads over an area of about three to four feet. When the valve is backed up a little further, the area covered by the mist is not so great, but the gun has a longer range. A gradual backing up of the valve, until it is completely disengaged from the valve seat and also from the whirling plate, will cause the whirl to disappear from the stream issuing from the gun head, and the stream will be ejected with sufficient force to carry it a considerable distance into the air, i. e., a distance of seventy feet. The long fins 14 not only act as guides for the rod 5 but also take the whirl out of the water. The force of the stream passing through the air for this distance breaks it up into a spray before the liquid reaches the article to be treated. This steam is sufficient to reach the tops of tall trees. As heretofore stated, two fins 14 are used for preventing the whirling of the fluid until it strikes the plate 10. The device is extremely simple in construction, and provides a novel manner of combining a gun with a spray rod.

Although we have shown and described one embodiment of our invention, it is to be understood that the same is susceptible of various changes, and we reserve the right to employ such changes as may come within the scope of the appended claim.

We claim:

A combined spray rod and gun comprising a tubular member, a gun nozzle placed at one end of said member, a valve for controlling the flow of water through said nozzle, a handle disposed at the opposite end of said tubular member for controlling the movement of the valve, a spray nozzle having its axis inclined with respect to the longitudinal axis of the tubular member, said nozzle being in communication with and supported by said tubular member, a manually-controlled valve for controlling the flow of fluid through said spray nozzle, and a fluid inlet pipe for said tubular member for delivering fluid to the gun or the spray rod.

ERNEST CLYDE TAYLOR.
DAVID BARCLAY MACKIE.